United States Patent
Yu et al.

(10) Patent No.: US 11,184,669 B2
(45) Date of Patent: Nov. 23, 2021

(54) DISTRIBUTION OF NETWORK TRAFFIC FOR STREAMING CONTENT

(71) Applicant: Google LLC, Mountain View, CA (US)

(72) Inventors: Jiayao Yu, New York, NY (US); Tammy Wu, New York, NY (US); Christopher Dinn, Mountain View, CA (US); Ioan Marius Pungaru, Brooklyn, NY (US); James Giles, Yorktown Heights, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/462,398

(22) PCT Filed: Oct. 25, 2017

(86) PCT No.: PCT/US2017/058235
§ 371 (c)(1),
(2) Date: May 20, 2019

(87) PCT Pub. No.: WO2019/083520
PCT Pub. Date: May 2, 2019

(65) Prior Publication Data
US 2019/0373316 A1    Dec. 5, 2019

(51) Int. Cl.
*H04N 21/44* (2011.01)
*H04N 21/2187* (2011.01)
*H04N 21/262* (2011.01)

(52) U.S. Cl.
CPC ... *H04N 21/44016* (2013.01); *H04N 21/2187* (2013.01); *H04N 21/26216* (2013.01)

(58) Field of Classification Search
CPC ......... H04N 21/44016; H04N 21/2187; H04N 21/26216
(Continued)

(56) References Cited

U.S. PATENT DOCUMENTS 6,704,930 B1 * 3/2004 Eldering ............... H04N 21/47
725/36
9,674,567 B1    6/2017 Carter
(Continued)

OTHER PUBLICATIONS

Office Action for CN Appln. Ser. No. 201780074303.X dated Sep. 30, 2020 (5 pages).
(Continued)

*Primary Examiner* — Nnenna N Ekpo
(74) *Attorney, Agent, or Firm* — Marshall, Gerstein & Borun LLP

(57) ABSTRACT

Systems and methods for distributing network traffic during streaming are hereby provided. A server can provide a first content pod to a client device for insertion in a content break separating a first portion and a second portion of the streaming content. The server can receive, from the client device during playback of the first content pod, a request for content to insert into the content break for playback subsequent to playback of the first content pod. The request for content can be generated at a first elapsed time from initiation of playback of the first content pod via a request generation policy. The server can select a second content pod. The server can provide the second content pod to the client device during the playback of the first content pod for playback subsequent to completion of the playback of the first content pod.

22 Claims, 7 Drawing Sheets

(58) Field of Classification Search
USPC .......................................................... 725/32
See application file for complete search history.

(56) References Cited

U.S. PATENT DOCUMENTS

| | | | | |
|---|---|---|---|---|
| 2002/0087975 | A1* | 7/2002 | Schlack | H04N 21/26241 |
| | | | | 725/34 |
| 2002/0166120 | A1* | 11/2002 | Boylan, III | H04N 21/4542 |
| | | | | 725/35 |
| 2004/0194130 | A1* | 9/2004 | Konig | H04N 5/76 |
| | | | | 725/32 |
| 2004/0268387 | A1* | 12/2004 | Wendling | H04N 5/4401 |
| | | | | 725/35 |
| 2005/0193410 | A1* | 9/2005 | Eldering | H04N 21/4622 |
| | | | | 725/34 |
| 2006/0287915 | A1* | 12/2006 | Boulet | H04L 12/14 |
| | | | | 705/14.61 |
| 2013/0263180 | A1* | 10/2013 | Yang | H04N 21/812 |
| | | | | 725/32 |
| 2015/0046942 | A1 | 2/2015 | Eyer | |
| 2015/0325268 | A1* | 11/2015 | Berger | G11B 27/102 |
| | | | | 386/248 |
| 2015/0358689 | A1* | 12/2015 | Wen | H04L 65/40 |
| | | | | 725/32 |

OTHER PUBLICATIONS

Examination Report for EP Appln. Ser. No. 17794881.7 dated May 25, 2020 (4 pages).
International Preliminary Report on Patentability, Ch. I, for PCT Appln. Ser. No. PCT/US2017/058235 dated May 7, 2020 (9 pages).
International Search Report and Written Opinion for PCT Appln. Ser. No PCT/US2018/037942 dated Jul. 23, 2018 (14 pages).
International Search Report and Written Opinion for PCT Appln. Ser. No. PCT/US2017/058235 dated Apr. 25, 2018 (15 pages).

* cited by examiner

DISTRIBUTION OF NETWORK TRAFFIC FOR STREAMING CONTENT

CROSS-REFERENCE TO RELATED APPLICATIONS

The present application is a National Stage Application, filed under 35 U.S.C. 371, of International Patent Application No. PCT/US2017/058235 filed on Oct. 25, 2017, titled "DISTRIBUTION OF NETWORK TRAFFIC FOR STREAMING CONTENT," the entirety of which is incorporated by reference herein.

BACKGROUND

Servers can transmit streaming content via computer network environments for presentation on a multitude of client devices. The processing and communication can consume bandwidth on the network and computing resources at the servers and client devices. Additionally, during the transmission of the streaming content, the client devices and server can exchange data packets.

SUMMARY

At least one aspect is directed to a method of distributing network traffic during streaming, comprising: providing, by a data processing system having one or more processors, to each client device of a plurality of client devices, a respective first content item arranged to cause the client device to play respective first content during a content break between first and second portions of a content stream; for each client device of the plurality of client devices, receiving, by the data processing system, a respective request for a respective second content item, each respective request being received during playback of the respective first content item, wherein a first respective request is associated with a first client device of the plurality of client devices is generated at a first time and a second respective request associated with a second client device of the plurality of client devices is generated at a second time different to the first time. A second respective content item is provided to each of the plurality of client devices by the data processing system, during playback of the content associated with the respective first content item, each second respective content item being provided based upon the respective request and being arranged to cause the client device to play respective second content subsequent to completion of playback of the respective first content.

A first of the respective first content items may be provided to a third client device at a third time and a second of the respective first content items is provided to a fourth client device at a fourth time, wherein the third time and fourth time are different. Each first respective request for a respective second content item may comprise a respective content selection parameter associated with the respective second client device, wherein each second respective content item is provided based upon the respective content selection parameter. The content selection parameter associated with the respective second client device may be generated by the client device when the respective first content is being played. The content selection parameter may include at least one of a reference address identifying an information resource associated with the content, historical interaction data on content by the first client device, or a reference identifying the respective first content. At least one second respective content item associated with a respective client device may be further provided based upon at least one further request from the respective client device for a respective third content item, wherein the at least one further request is associated with a content break occurring prior to the content break between first and second portions of the content stream. The at least one further request may comprise a further content selection parameter associated with the respective client device. The method may further comprise determining, by the data processing system, that a request received from a client device of the plurality of client devices is generated during playback of the first content based on a time of receipt of the request. Providing a second respective content item may further comprise selecting the second content item, responsive to determining that the request received from the client device is generated during playback of the first content.

The method may further comprise: maintaining, by the data processing system, a log including a plurality of entries, each entry of the log indicating whether a respective client device is to select a corresponding content item using a respective content selection parameter; determining, by the data processing system, that a client device is to receive a second content item using a first content selection parameter included in a respective request based on a first entry of the log corresponding to the respective client device; and wherein selecting a second respective content item further comprises selecting the second content item based on the first content selection parameter of the first respective request, responsive to determining that the first client device is to receive the second content pod using the first content selection parameter based on the first entry. Receiving the first respective request may further comprise receiving the first respective request for content generated via a first request generation policy of a central request generation policy, the central request generation policy specifying a respective time for generating a respective request for each client device of the plurality of client devices; and wherein receiving a second respective request further comprises receiving the second respective request for content generated via a second request generation policy of the central request generation policy.

The method may further comprise: receiving, by the data processing system, from a client device of the plurality of client devices during the second portion of the content stream, a further request for content to insert into a second content break separating the second portion of the content stream and a third portion of the content stream, the third request generated at a third time during the second portion of the content stream via a third request generation policy; and providing, by the data processing system, a fourth content item to the client device for insertion in the subsequent content break separating the second portion of a content stream and the third portion of the content stream.

At least one aspect is directed to a method of distributing network traffic during streaming. A data processing system having one or more processors can provide, to each client device of a plurality of client devices, a first respective content pod to the client device for insertion in a content break separating a first portion of streaming content and a second portion of the streaming content. The data processing system can receive, from a first client device of the plurality of client devices during playback of the first content pod, a first request for content to insert into the content break for playback subsequent to playback of the first respective content pod. The first request for content can be generated at a first time that has elapsed since initiation of playback of the first content pod via a first request generation policy. The data processing system can receive, from a second client device of the plurality of client devices during playback of the second content pod, a second request for content to insert into the content break for playback subsequent to playback of the second respective content pod. The second request for content can be generated at a second time that has elapsed since initiation of playback of the second content pod via a second request generation policy. The data processing system can select a second content pod responsive to the first request from the first client device and a third content pod responsive to the second request from the second client device. The data processing system can provide the second content pod to the first client device and the third content pod to the second client device during the playback of the first respective content pod for playback subsequent to completion of the playback of the first respective content pod.

In some implementations, the first respective content pod provided to the first client device may be a fourth content pod and the first respective content pod provided to the second client device may be a fifth content pod. In some implementations, providing the first respective content pod may further include providing the fourth content pod to the first client device at a third time during the first portion of the streaming content in accordance with a pod distribution policy and providing the fifth content pod at a fourth time different from the third time during the first portion of the streaming content in accordance with the pod distribution policy.

In some implementations, providing the first respective content pod may further include providing the first respective content pod to each client device of the plurality of client devices. The first respective content pod may include a first request specifier specifying that the client device is to send a subsequent request with a content selection parameter. In some implementations, receiving the first request may further include receiving the first request from the first client device, the first request including a first content selection parameter generated at the first time during playback of the first content pod via the first request generation policy responsive to a first request specifier included with the first respective content pod. The first request specifier can specify that the first client device is to send the first request with the first content selection parameter.

In some implementations, selecting the second content pod can further include selecting the second content pod based on previous requests for content to insert into previous content breaks and on the streaming content. Each of the previous requests can be received from the first client device prior to the first request for content and including a content selection parameter. In some implementations, selecting the second content pod responsive to the first request from the first client device may further include selecting the second content pod based on a content selection parameter included in the first request. The content selection parameter can be generated by the first client device at the first time during playback of the first content pod. The content selection parameter can include at least one of a reference address identifying an information resource on which the streaming content is displayed, historical interaction data on content by the first client device, or a pod reference identifying the first respective content pod provided to the first client device.

In some implementations, the data processing system can determine that the first request received from the first client device is generated during playback of the first content pod via the first request generation policy based a time of the receipt of the first request. In some implementations, selecting the second content pod can further include selecting the second pod, responsive to determining that the first request received from the first client device is generated during playback of the first content pod.

In some implementations, the data processing system can maintain a request specifier log including a plurality of entries. Each entry of the request specifier log can indicate whether a respective client device is to select a corresponding content pod using a respective content selection parameter. In some implementations, the data processing system can determine that the first client device is to receive the second content pod using a first content selection parameter included in the first request based on a first entry of the request specifier log corresponding to the first client device. In some implementations, selecting the second content pod can further include selecting the second pod based on the first content selection parameter of the first request, responsive to determining that the first client device is to receive the second content pod using the first content selection parameter based on the first entry.

In some implementations, receiving the first request can further include receiving the first request for content generated via the first request generation policy of a central request distribution policy. The central request distribution policy can specify a respective time for generating a respective request for each client device of a plurality of client devices. In some implementations, receiving the second request can further include receiving the second request for content generated via the second request generation policy of the central request distribution policy.

In some implementations, the data processing system can receive, from the first client device of the plurality of client devices during the second portion of the streaming content, a third request for content to insert into a second content break separating the second portion of the streaming content and a third portion of the streaming content, the third request generated at a third time during the second portion of the streaming content via a third request generation policy. In some implementations, the data processing system can provide a fourth content pod to the first client device for insertion in the subsequent content break separating the second portion of streaming content and the third portion of the streaming content.

At least one aspect is directed to a system for distributing network traffic during streaming. The system can include a response manager executed on a data processing system having one or more processors. The response manager can provide, to each client device of a plurality of client devices, a first respective content pod to the client device for insertion in a content break separating a first portion of streaming content and a second portion of the streaming content. The system can include a request handler executed on the data processing system. The request handler can receive, from a first client device of the plurality of client devices during playback of the first content pod, a first request for content to insert into the content break for playback subsequent to playback of the first respective content pod. The first request for content can be generated at a first time that has elapsed since initiation of playback of the first content pod via a first request generation policy. The request handler can receive, from a second client device of the plurality of client devices during playback of the second content pod, a second request for content to insert into the content break for playback subsequent to playback of the second respective content pod. The second request for content can be generated at a second time that has elapsed since initiation of playback of the second content pod via a second request generation policy. The system can include a content selector executed on the data processing system. The content selector can select a second content pod responsive to the first request from the first client device and a third content pod responsive to the second request from the second client device. The response manager can provide the second content pod to the first client device and the third content pod to the second client device during the playback of the first respective content pod for playback subsequent to completion of the playback of the first respective content pod.

In some implementations, the first respective content pod provided to the first client device can be a fourth content pod and the first respective content pod provided to the second client device can be a fifth content pod. In some implementations, the response manager can provide the fourth content pod to the first client device at a third time during the first portion of the streaming content in accordance with a pod distribution policy. In some implementations, the response manager can provide the fifth content pod at a fourth time different from the third time during the first portion of the streaming content in accordance with the pod distribution policy.

In some implementations, the response manager can provide the first respective content pod to each client device of the plurality of client devices. The first respective content pod can include a first request specifier specifying that the client device is to send a subsequent request with a content selection parameter. In some implementations, the response manager can provide the first respective content pod to each client device of the plurality of client devices. The first respective content pod can include a first request specifier specifying that the client device is to send a subsequent request with a content selection parameter.

In some implementations, the request handler can receive the first request from the first client device. The first request can include a first content selection parameter generated at the first time during playback of the first content pod via the first request generation policy responsive to a first request specifier included with the first respective content pod. The first request specifier can specify that the first client device is to send the first request with the first content selection parameter.

In some implementations, the content selector can select the second content pod based on previous requests for content to insert into previous content breaks and on the streaming content. Each of the previous requests can be received from the first client device prior to the first request for content and can include a content selection parameter.

In some implementations, the content selector can select the second content pod based on a content selection parameter included in the first request. The content selection parameter can be generated by the first client device at the first time during playback of the first content pod. The content selection parameter can include at least one of a reference address identifying an information resource on which the streaming content is displayed, historical interaction data on content by the first client device, or a pod reference identifying the first respective content pod provided to the first client device.

In some implementations, the request handler can determine that the first request received from the first client device is generated during playback of the first content pod via the first request generation policy based a time of the receipt of the first request. In some implementations, the content selector can select the second pod, responsive to determining that the first request received from the first client device is generated during playback of the first content pod.

In some implementations, the response handler can maintain a request specifier log including a plurality of entries. Each entry of the request specifier log can indicate whether a respective client device is to select a corresponding content pod using a respective content selection parameter. In some implementations, the response handler can determine that the first client device is to receive the second content pod using a first content selection parameter included in the first request based on a first entry of the request specifier log corresponding to the first client device. In some implementations, the content selector can select the second pod based on the first content selection parameter of the first request, responsive to determining that the first client device is to receive the second content pod using the first content selection parameter based on the first entry.

In some implementations, the request handler can receive the first request for content generated via the first request generation policy of a central request distribution policy. The central request distribution policy can specify a respective time for generating a respective request for each client device of a plurality of client devices. In some implementations, the request handler can receive the second request for content generated via the second request generation policy of the central request distribution policy.

In some implementations, the request handler can receive, from the first client device of the plurality of client devices during the second portion of the streaming content, a third request for content to insert into a second content break separating the second portion of the streaming content and a third portion of the streaming content. The third request can be generated at a third time during the second portion of the streaming content via a third request generation policy. In some implementations, the content selector can provide a fourth content pod to the first client device for insertion in the subsequent content break separating the second portion of streaming content and the third portion of the streaming content.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
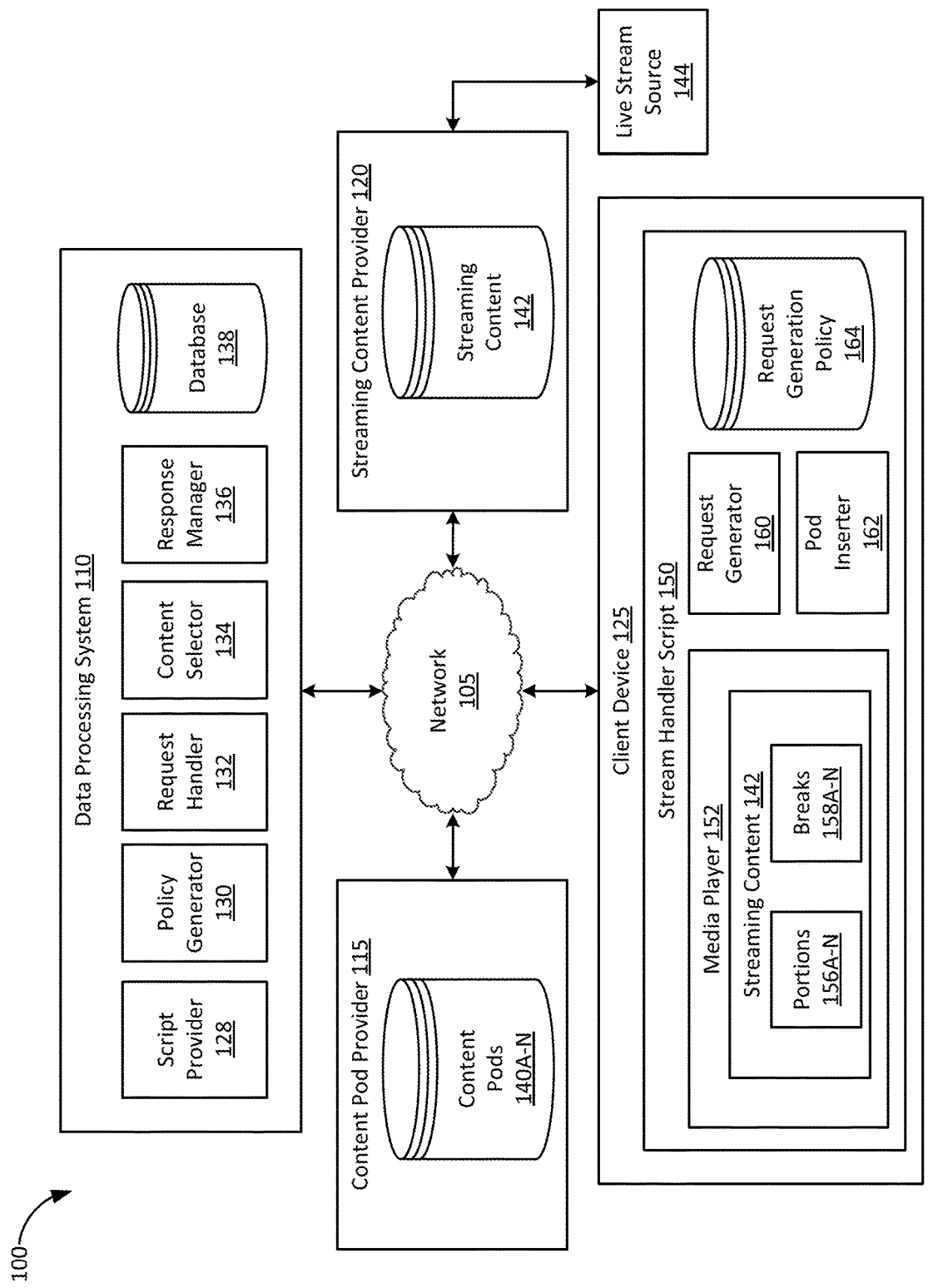
FIG. 1 is a block diagram depicting a computer networked environment for distributing network traffic during streaming, according to an illustrative implementation.

Following below are more detailed descriptions of various concepts related to, and implementations of, methods, apparatuses, and systems of distributing network traffic during streaming. The various concepts introduced above and discussed in greater detail below may be implemented in any of numerous ways, as the described concepts are not limited to any particular manner of implementation.

Under current schemes for dynamically inserting supplementary audiovisual content into streaming content, each client device being provided with the streaming content can generate and transmit a request for content upon reaching a content break to an external server. The request may then be used by the server to select a set of content pods (e.g., an audio, a video, or audiovisual content item that may be interactive or non-interactive) customized for each individual client device. To send the most up-to-date information to select relevant content pods to insert at the content break, the generation and transmission of the request may be timed immediately prior to the content break.

For live streaming content, the content break may occur at the same time across the multitude of client devices. As such, all the requests for content from the multitude of client devices may arrive at the server simultaneously. Selection of the content pod to insert into the streaming content using relevancy information may be highly resource-intensive for the server. In addition, the arrival of the requests at or approximately the same time may exacerbate the consumption of computing resources at the server and the available bandwidth in the network.

To lower the consumption of resources at the server and the bandwidth at communication network while selecting the most relevant content pod to insert into the streaming video, the present systems and methods provide a hybrid approach. In brief overview, first, a content pod may be selected asynchronously during the live stream for playback in a content break. Second, another content pod may be selected synchronously with up-to-date relevancy information at any time as the first content pod is played at the client device and may be inserted in the same content break as the first content pod.

Any time prior to the content break, the client device can send a request for pre-fetched content. The first request can include a specifier indicating that the client device is to receive pre-fetched content. Once received, the server can provide a response with a content pod to the client device. The response may also include a specifier indicating that the client device is to send a request for supplemental content with content selection parameters in the subsequent request to insert into the upcoming content break. Once received, the client device can cache the content pod in a local cache. Then, at the onset of the content break in the streaming content, the client device can play the cached content pod.

At some random point in time during the playing of the pre-fetched content pod, the client device may identify relevancy information to insert into a request for supplemental content based on the specifier from the previous response. The random point in time may be set, such that the server does not receive the requests from the multitude of client devices all at once. This subsequent request for supplemental content can also include the specifier that the client device is to receive the content pod based on the relevancy information. Upon receipt of the second request, the server can select another content pod using the relevancy information, and may send a response including the selected video content pod to the client device. The client device can then play the selected video content pod after the pre-fetched video content pod has completed playing.

By staggering the time at which requests for supplemental content to insert into content breaks are generated and transmitted, the number of requests to be processed at the server at any given time for the same number of client devices may be reduced. In addition, network bandwidth may be freed up and consumption of computing resources may be alleviated. Moreover, the likelihood of delay in the insertion of the selected content pod into the content break may also be lessened, whilst still transmitting content that is tailored to the client device.

The subject matter therefore may address problems associated with delivery of content to multiple devices over a computer network in response to requests from the multiple devices that all occur within a predetermined, usually short, time period. In addition, the subject matter may allow content to be delivered to multiple devices that is based upon a current state of each of the multiple devices and/or users of the devices without the devices experiencing a delay in delivery of content, even when each of the multiple devices all request content within a short time period (e.g., within 0 to 60 seconds).

Referring now to FIG. 1, FIG. 1 is a block diagram depicting one implementation of an environment for distributing network traffic during streaming in a computer network environment. The environment 100 includes at least one data processing system 110. Although only one data processing system 110 is illustrated, in many implementations, data processing system 110 may be a farm, cloud, cluster, or other grouping of multiple data processing systems or computing devices. The data processing system 110 can include at least one processor and a memory, sometimes referred to as a processing circuit, each of which are discussed in more detail below in connection with FIG. 5. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content pod provider 115, at least one streaming content provider 120, or at least one client device 125. The network 105 may be any form of computer network that relays information between the content pod provider 115, data processing system 110, client device 125 and one or more content sources, for example, web servers, advertising servers, among others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the client device 125 may communicate wirelessly (e.g., via WiFi, cellular, radio, etc.) with a transceiver that is hardwired (e.g., via a fiber optic cable, a CAT5 cable, etc.) to other computing devices in network 105.

The content pod providers 115, the streaming content providers 120, and the client devices 125 can include a processor and a memory or a processing circuit as discussed above and as discussed in more detail in connection with FIG. 5. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EE-PROM), erasable-programmable ROM (EPROM), flash memory, optical media, or any other suitable memory from which the processor can read instructions. The instructions may include code from any suitable computer-programming language.

The content pod providers 115, the streaming content providers 120, and the client devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content pod providers 115, the streaming content providers 120, and the client devices 125 (e.g., a built-in display, microphone, etc.) or external to the housing of content pod providers 115, the streaming content providers 120, and the client devices 125 (e.g., a monitor connected to the client device 125, a speaker connected to the client device 125, etc.), according to various implementations. For example, the content pod providers 115, the streaming content providers 120, and the client devices 125 may include an electronic display, which visually displays information resources or multimedia content received from one or more content sources and/or from the data processing system 110 via the network 105. In some implementations, a content placement manager or third-party content provider can communicate with the data processing system 110 via the content pod providers 115. In some implementations, the content placement manager or third-party content provider can communicate with the data processing system 110 via a user interface displayed on the user interface devices of the content pod providers 115.

The content pod providers 115 can include servers or other computing devices operated by a content provider entity to provide content pods 140A-N to provide to the streaming content played on a media player 152 or another application executed on the client device 125. In some implementations, the content pod providers 115 can provide reference addresses (sometimes referred to as pointers) for each corresponding content pod 140A-N for the client device 125. The content pod providers 115 can each include desktop computers, laptop computers, tablet computers, wearable computers, smartphones, personal digital assistants, mobile devices, consumer computing devices, servers, clients, digital video recorders, a set-top box for a television, a television (e.g., a smart television), a video game console, or any other computing device configured to communicate via the network 105. The content pods 140A-N provided by the content pod provider 115 can include third party content pods in various formats (e.g., textual content elements, image files, audio files, video files, audiovisual files, or any other multimedia format) to display with or insert into the streaming content provided by the streaming content providers 120. In some implementations, the content pods 140A-N may be interactive, and may include one or more user elements to trigger various functionalities (e.g., retrieve a landing page or display other content within the same content pod 140A-N). The content pods 140A-N associated with the content pod provider 115 can be presented in content breaks between various portions of the streaming content provided by the streaming content provider 120. The content pod providers 115 can maintain a database for content pods 140A-N. Each content pod 140A-N may be identified by a reference address (e.g., a Uniform Resource Locator (URL) or some alphanumeric identifier). The content pod providers 115 can transmit the content pod 140A-N corresponding to the reference address (sometimes referred to as the pointer) included in a request for content.

The streaming content providers 120 can include servers or other computing devices operated by streaming content providing entity to provide streaming content 142 to be played on the media player 152 or another application executed on the client device 125. The streaming content providers 120 can each include desktop computers, laptop computers, tablet computers, wearable computers, smartphones, personal digital assistants, mobile devices, consumer computing devices, servers, clients, digital video recorders, a set-top box for a television, a television (e.g., a smart television), a video game console, or any other computing device configured to communicate via the network 105. The streaming content 142 can include one or more data packets with multimedia content. The streaming content provider 120 can transmit the one or more data packets in sequence forming the streaming content 142 to the client device 125 via the network 105. The transmission of the one or more data packets for the streaming content 142 can be in accordance with any communications protocol, such as User Datagram Protocol (UDP), Transmission Control Protocol (TCP), Real-time Streaming Protocol (RTSP), Real-time Transport Protocol (RTP), Real-time Transport Control Protocol (RTCP), and Hypertext Transfer Protocol (HTTP), among others. In some implementations, the streaming content provider 120 can be communicatively connected to a live stream source 144. The live stream source 144 can include a computing device with an audio input source (e.g., a microphone or transducer) or a video input source (e.g., a video camera or camera), among others. The live stream source 144 can provide the streaming content 142 in the form of one or more data packets to the streaming content provider 120. As the data packets are received from the live stream source 144, the streaming content provider 120 can transmit the one or more data packet of the streaming content 142 via the network 105 to the client device 125 The streaming content provider 120 can maintain a database for the streaming content 142. The streaming content 142 may be identified by a reference address (e.g., a Uniform Resource Locator (URL) or some alphanumeric identifier).

The client devices 125 can include computing devices to communicate via the network 105 to display data, such as the streaming content 142 from the streaming content provider 120 and the content pods 140A-N from the content pod provider 115, among others. The client device 125 can each include desktop computers, laptop computers, tablet computers, wearable computers, smartphones, personal digital assistants, mobile devices, consumer computing devices, servers, clients, digital video recorders, a set-top box for a television, a television (e.g., a smart television), a video game console, or any other computing device configured to communicate via the network 105. The client devices 125 can be communication devices through which an end user can submit requests for various types of content, such as information resources (e.g., webpages) and multimedia content (e.g., the streaming content 142).

The data processing system 110 can include at least one server. In some implementations, the data processing system 110 can include a plurality of servers located in at least one data center or server farm. In some implementations, the data processing system 110 may include a content placement system. In some implementations, the data processing system 110 can include at least one script provider 128, at least one policy generator 130, at least one request handler 132, at least one content selector 134, at least one response handler 136. The data processing system 110 can also include one or more content repositories or databases 138. In some implementations, the content pod provider 115 can be part of the data processing system 110. The entity associated with the content pod provider 115 may be the same as the entity associated with the data processing system 110. In some implementations, the streaming content provider 120 can be part of the data processing system 110. The entity associated with the streaming content provider 120 may be the same as the entity associated with the data processing system 110. In some implementations, the data processing system 110 can assemble the streaming content 142 provided by the streaming content provider 142 with the content pods 140A-N provided by the content pod provider 115. The streaming content 142 may be interspersed with the content pods 140A-N at predesignated content breaks. The data processing system 110 can stream the assembly of the streaming content 142 with the content pods 140A-N to the client devices 125 via the network 105.

The script provider 128, the policy generator 130, the request handler 132, the content selector 134, and the response handler 136 can each include at least one processing unit, server, virtual server, circuit, engine, agent, appliance, or other logic device such as programmable logic arrays configured to communicate with the database 138 and with other computing devices (e.g., the content pod provider 115, the streaming content providers 120, and the client device 125) via the network 105. The script provider 128, the policy generator 130, the request handler 132, the content selector 134, and the response handler 136 can each include or execute at least one computer program or at least one script. The script provider 128, the policy generator 130, the request handler 132, the content selector 134, and the response handler 136 can be separate components, a single component, or part of the data processing system 110. The script provider 128, the policy generator 130, the request handler 132, the content selector 134, and the response handler 136 can include combinations of software and hardware, such as one or more processors configured to execute one or more scripts.

The data processing system 110 can also include one or more content repositories or databases 138. The databases 138 can be local to the data processing system 110. In some implementations, the databases 138 can be remote to the data processing system 110 but can communicate with the data processing system 110 via the network 105. The databases 138 can include the content pods 140A-N provided by the content pod provider 115 or the reference addresses identifying each content pod 140A-N. The databases 138 can include the streaming content 142 provided by the streaming content provider 142 or the reference addresses identifying each streaming content 142. The databases 138 can also include a request distribution policy and a predefined request generation time to insert content breaks into each streaming content 142 for insertion of the content pods 140A-N, among other data. Additional details of the contents of the database 138 will be provided below.

The script provider 128 can transmit a stream handler script 150 to the client device 125, in response to receiving a request from the client device 125. In some implementations, the request may correspond to a request for streaming content. An application executing on the client device 125 (e.g., a web browser) may generate and send the request for streaming content to display to the script provider 128. In some implementations, the request may correspond to a request for code. When the request corresponds to the request for code, the streaming content 142 may be already provided on a separate application running on the client device 125. In either case, the request may include a reference address identifying the streaming content 142 playing or to be provided on the client device 125. The script provider 128 can parse the reference address to identify the streaming content provider 120 and the streaming content 142.

With the identification of the streaming content 142, the script provider 128 can define one or more streaming content portions 156A-N of the streaming content 142. Each streaming content portion 156A-N may correspond to a partition of the primary streaming content 142 from the streaming content provider 120 or to a subset of the one or more data packets forming the streaming content 142. The script provider 128 can also define one or more content breaks 158A-N of the streaming content 142. The one or more content breaks 158A-N may correspond to a time at which to insert the content pod 140A-N and a length of time for playback of the content pod 140A-N at the client device 125. The one or more content breaks 158A-N may be interleaved with the one or more streaming content portions 156A-N of the streaming content 142. The one or more content breaks 158A-N may be at the same time across multiple client devices 125 receiving and playing the streaming content 142. Due to latency in the network 105 or consumption of computing resources at each client device 125, the one or more content breaks 158A-N may occur at substantially the same time (e.g., 66-99% similar) across the multiple client devices 125 receiving and playing the streaming content 142. The one or more content breaks 158A-N may be of the same length of time across the multiple client devices 125 receiving and playing the streaming content 142. Due to latency in the network 105 or consumption of computing resources at each client device 125, the one or more content breaks 158A-N may be of substantially the same length of time (e.g., 66-99% similar) across the multiple client devices 125 receiving and playing the streaming content 142. In some implementations, the streaming content portions 156A-N and the content breaks 158A-N may be pre-set by the streaming content provider 120 or the script provider 128. In some implementations, the streaming content portions 156A-N and the content breaks 158A-N may be dynamically set by the streaming content provider 120 or the script provider 128, as the streaming content 142 is transmitted to the client device 125. While transmitting the streaming content 142 via the network 105, the streaming content provider 120 can transmit a content break indicator to the script provider 128 or to the recipient client device 125 to insert the content break 158A-N. The content break indicator may specify a time at which to insert the content break 158A-N into the streaming content 142. The time at which to insert the content break 158A-N may be relative to a current time from the beginning of the streaming content 142 or one of the streaming content portions 156A-N measured by a timer maintained at the client device 125, the streaming content provider 120, or the data processing system 110.

Additionally, the script provider 128 can generate the stream handler script 150. The stream handler script 150 can include a request generator 160, a pod inserter 162, and a request generation policy 164, among others. In some implementations, the stream handler script 150 can include the media player 152 to play the streaming content 142 from the streaming content provider 120. The media player 152 can include the reference address identifying the streaming content 142 to be provided to the client device 125. In some implementations, the media player 152 may be separate from the stream handler script 150, and can interface with the stream handler script 150. In some implementations, the stream handler script 150 can also include definitions for the one or more streaming content portions 156A-N and the one or more breaks 158A-N in the streaming content 142. In some implementations, the stream handler script 150 can further include a request specifier. The request specifier can specify whether the client device 125 is to send a request for content with a content selection parameter. The request specifier can be initially set to a first value indicating that the client device 125 is to send a request for content without the content selection parameter, and then be set to a second value indicating that the client device 125 is to send a request for content with the content selection parameter. In some implementations, the request specifier may be maintained at the database 138. The media player 152, the request generator 160, and the pod inserter 162 can each include at least one processing unit, server, virtual server, circuit, engine, agent, appliance, or other logic device such as programmable logic arrays configured to communicate with other computing devices, such as the data processing system 110, the content pod provider 115, and the streaming content provider 120 via the network 105.

For inclusion into the streaming handler script 150, the policy generator 130 can determine the request generation policy 164 for the client device 125. The request generation policy 164 for the client device 125 may be part of a central request distribution policy maintained at the database 138. In some implementations, the request generation policy 164 can specify a plurality of predefined request generation times at which the request generator 160 of the stream handler script 150 is to generate and transmit a request for content to insert content into the content break 158A-N. The request for content to insert into the content break 158A-N may be generated during one of the streaming content portions 156A-N of the streaming content 142 (sometimes referred to a request for pre-fetched content). The request for content to insert into the content break 158A-N may be generated during one of the content breaks 158A-N during the playback of another content pod 140A-N (sometimes referred to a live request). The policy generator 130 can determine the predefined request generation time based on a time at occurrence of the streaming content portions 156A-N and the content breaks 158A-N. In some implementations, the functionalities of the policy generator 130 may be performed by the client device 125, subsequent to receipt of the streaming handler script 150 by the client device 125. Upon receipt of the streaming handler script 150, the client device 125 may execute the functionalities of the policy generator 130 to generate the plurality of predefined request generation times for the request generation policy 164.

To determine the predefined request generation time for the request for content to be generated during one of the streaming content portions 156A-N of the streaming content 142, the policy generator 130 can identify an initial time and a terminal time for the corresponding streaming content portion 156A-N of the streaming content 142. The initial time can correspond to a time when the corresponding streaming content portion 156A-N is to start playing, and may be preceded by a previous content break 158A-N. The terminal time can correspond to a time when the corresponding streaming content portion 156A-N is to end playing, and may be succeeded by a subsequent content break 158A-N. The policy generator 130 can determine the predefined request generation time between the initial time and the terminal time of the corresponding streaming content portion 156A-N. The policy generator 130 can determine the predefined request generation time for the request generation policy 164 for a particular client device 125, such that at least one client device 125 generates the request for content different from at least one other client device 125. In some implementations, the policy generator 130 can generate a random probability distribution (e.g., uniform, chi-squared, normal, or Poisson, etc.) the initial time and the terminal time of the corresponding streaming content portion 156A-N. The policy generator 130 can generate the random probability distribution further based on a number of client devices 125 receiving the streaming content 142. Using the random probability distribution, the policy generator 130 can determine the predefined request generation time for the particular client device 125. In some implementations, the policy generator 130 can use a random number generator to generate a predefined request generation time for each client device 125. The range of the predefined request generation times generated by the random number generator may be set using the expected initial and terminal times of the corresponding streaming content portion 156A-N. In some implementations, the policy generator 130 can use a predefined allocation schedule for the corresponding streaming content portion 156A-N to determine the predefined request generation time for the request generation policy 164. The predefined allocation schedule may be from the central request distribution policy maintained at the database 138. In some implementations, the policy generator 130 can set the predefined request generation time for the very first streaming content portion 156A-N in the streaming content 142 to the start time of the streaming content portion 156A-N.

To determine the predefined request generation time for the request for content to be generated during the content break 158A-N, the policy generator 130 can identify an initial time and a terminal time of the corresponding content break 158A-N. The initial time can correspond to a time when the corresponding content break 158A-N is to start playing, and may be preceded by a previous streaming content portion 156A-N. The terminal time can correspond to a time when the corresponding content break 158A-N is to end playing, and may be succeeded by a subsequent streaming content portion 156A-N. The policy generator 130 can also determine an expected time duration of each content pod 140A-N to be inserted into the content break 158A-N. To determine the expected time duration, the policy generator 130 can identify a schedule for content pods 140A-N to be inserted into the content break 158A-N. The schedule may be predetermined by the streaming content provider 120, and can indicate a number of content pods 140A-N to be inserted into each content break 158A-N. Based on the schedule, the policy generator 130 can determine the expected time duration of each content pod 140A-N in the corresponding content break 158A-N. Using the initial time and the terminal time of the content break 158A-N, the policy generator 130 can determine an expected initial time and an estimated terminal time of each content pod 140A-N to be inserted into the content break 158A-N. In some implementations, the policy generator 130 can use a predefined allocation schedule for the corresponding content break 158A-N to determine the predefined request generation time for the request generation policy 164. The predefined allocation schedule may be from the central request distribution policy maintained at the database 138.

Having identified the initial time and the terminal time of the content break 158A-N and the expected initial time and the terminal time of the content pods 140A-N, the script provider can determine the predefined request generation time for the request generation policy 164 between the initial time and the terminal time of each content break 158A-N. The policy generator 130 can determine the predefined request generation time for the request generation policy 164 for a particular client device 125, such that at least one client device 125 generates the request for content different from at least one other client device 125. In some implementations, the policy generator 130 can generate a random probability distribution (e.g., uniform, chi-squared, normal, or Poisson, etc.) based on the expected initial time and the expected terminal time of the corresponding content pod 140A-N. The policy generator 130 can generate the random probability distribution further based on a number of client devices 125 receiving the streaming content 142. In some implementations, the policy generator 130 can use a random number generator to generate a predefined request generation time for each client device 125. The range of the predefined request generation times generated by the random number generator may be set using the expected initial and terminal times of the corresponding content pod 140A-N. Using the random probability distribution, the policy generator 130 can determine the predefined request generation time for the particular client device 125.

With the generation of the streaming handler script 150, the script provider 128 can transmit the streaming handler script 150 to the client device 125 via the network 105. Upon receipt of the stream handler script 150, the client device 125 can execute the stream handler script 150. In running the stream handler script 150, the media player 152 can initialize retrieval the streaming content 142 as identified by the reference address from the streaming content provider 120 and play the streaming content 142 on the client device 125. In some implementations, the media player 152 can initialize retrieval of the streaming content 142 by playing the first streaming content portion 156A-N of the streaming content 142. The media player 152 can continuously receive the one or more data packets forming the stream content 142 from the streaming content provider 120. As described previously, in some implementations, the client device 125 can execute the functionalities of the policy generator 130 on the client device 125 itself to generate the request generation policy 164.

As the streaming content 142 is continuously received from the streaming content provider 120, the request generator 160 can generate a request to insert content into the content break 158A-N in accordance with the request generation policy 164. The request generator 160 can identify a current time within the playing of the streaming content 142. The current time can indicate an amount of time elapsed since a start time of the streaming content 142 by the streaming content provider 120. The start time and the time elapsed since the start time of the streaming content may be the same or substantially similar (e.g., 66-99% similar) across multiple client devices 125 receiving the streaming content 142. In some implementations, the request generator 160 can maintain a timer to keep track of the current time of the playing of the streaming content 142 from the start of the streaming content 142. In some implementations, the request generator 160 can identify the current time of the streaming content 142 from a time stamp included in the one or more data packets forming the streaming content 142. Having identifier the current time within the streaming content 142, the request generator 160 compare the current time with one of the predefined request generation times specified by the request generation policy 164. The request generator 160 can determine that the current time does not match one of the predefined request generation times specified by the request generation policy 164. If the current time does not match one of the predefined request generation times, the request generator 160 can continue to monitor the current time and compare the current time with the one of predefined request generation times specified by the request generation policy 164.

On the other hand, the request generator 160 can determine that the current time matches one of the predefined request generation times specified by the request generation policy 164. If the current time matches one of the predefined request generation times, the request generator 160 can generate the request for content to insert into the content break 158A-N. The request for content can include a device identifier corresponding to the client device 125, the reference address identifying the streaming content 142, the request specifier, a time stamp of generation, a time remaining in the streaming content portion 156A-N, a time remaining in the content break 158A-N, a sequence number for indexing the request, or a content selection parameter, among other data. As previously discussed, the predefined request generation times specified by the request generation policy 164 may be during one of the streaming content portions 156A-N or one of the content breaks 158A-N. As such, if the current time is during one of the streaming content portions 156A-N, the generation of the request for content may be during the playing of the streaming content 142. The request for content itself may be for insertion and playback of a content pod 140A-N into the content break 158A-N subsequent to the present streaming content portion 156A-N being played by the media player 152. Conversely, if the current time is during one of the content breaks 158A-N, the generation of the request for content may be during the playback of one of the content pods 140A-N. The request for content itself may be for insertion and playback of a content pod 140A-N subsequent to the playback of the present content pod 140A-N being played by the media player 152. Subsequent to generation of the request for content, the request generator 160 can transmit the request for content to the data processing system 110 via the network 105.

In generating the request for content to insert into the content break 158A-N, the request generator 160 can identify the request specifier. The request specifier may be initially received with the stream handler script 150 from the script provider 128. As previously discussed, the request specifier can specify whether the request for content is to be sent with a content selection parameter. The request generator 160 can determine whether the request specifier specifies that the request for content is to be sent with the content selection parameter. If the request specifier specifies that the request for content is not to be sent with the content selection parameter, the request generator 160 can transmit the request for content to insert into the content break 158A-N without any content selection parameters.

Conversely, if the request specifier specifies that the request for content is to be sent with the content selection parameter, the request generator 160 can determine the content selection parameter. The content selection parameter may include various information used to select content pods 140A-N relevant to the client device 125. The content selection parameter may include a reference address identifying an information resource on which the streaming content 142 is displayed. To include as the content selection parameter, the request generator 160 can identify the reference address identifying the information resource on which the streaming content 142 is displayed. The content selection parameter may include metadata for the streaming content portion 156A-N prior to the content break 158A-N, such as one or more tagged keywords. To include as the content selection parameter, the request generator 160 can identify the metadata for the content streaming content portion 156A-N prior to the content break 158A-N. The content selection parameter may also include the metadata of the content pod 140A-N being played by the media player 152, such as one or more tagged keywords. To include as the content selection parameter, the request generator 160 can identify the metadata for the content pod 140A-N being played by the media player 152. The content selection parameter may also include the reference address of the content pod 140A-N being played by the media player 152. To include as the content selection parameter, the request generator 160 can identify the reference address of the content pod 140A-N being played by the media player 152. The content selection parameter may include historical interaction data on content (e.g., the information resource, the streaming content 142, and other content pods 140A-N) by the client device 125. To include as the content selection parameter, the request generator 160 can retrieve the historical interaction data locally stored on the client device 125. The content selection parameter can include reference address identifying the streaming content 142. To include as the content selection parameter, the request generator 160 can identify the reference address identifying the streaming content 142. The content selection parameter can also include a location identifier and an account profile for the client device 125.

Subsequent to the generation of the request for content, the request generator 160 can transmit the request for content to insert into the content break 158A-N. The request handler 132 can receive the request for content to insert into the content break 158A-N from the client device 125. The request handler 132 can parse the request for content received from the client device 125 to identify the device identifier corresponding to the client device 125, the reference address identifying the streaming content 142, the request specifier, the time stamp of generation, the sequence number, the time remaining in the streaming content portion 156A-N, the time remaining in the content break 158A-N, or the content selection parameter, among other data. Each time the request for content is received, the request handler 132 can store the device identifier corresponding to the client device 125, the reference address identifying the streaming content 142, the request specifier, the time stamp of generation, the sequence number, the time remaining in the streaming content portion 156A-N, the time remaining in the content break 158A-N, or the content selection parameter in the database 138. It should be noted that because of the request generation policy, the requests for content may be received at the data processing system 110 from the multitude of client devices 125 at different times.

In parsing the request for content received from the client device 125, the request handler 132 can identify the request specifier of the request for content. The request handler 132 can then determine whether the request specifier indicates that the client device 125 is to send the content selection parameter with the request. If the request specifier is determined to indicate that the client device 125 is not to send the content selection parameter, the selection of the content pod 140A-N to provide to the client device 125 can be performed without the content selection parameter, as detailed below. If the request specifier is determined to indicate that the client device 125 is to send the content selection parameter, the request handler 132 can parse the request for content to identify the content selection parameter. The content selection parameter may be used to select the content pod 140A-N to provide to the client device 125.

The request handler 132 can also maintain a request specifier log for the requests for content received across the client devices 125. The request specifier log may be maintained at the database 138. The request specifier log may be a data structure (e.g., array, matrix, table, linked list, binary tree, hash map, heap, etc.), and can include one or more entries. Each entry of the request specifier log can include the device identifier corresponding to the respective client device 125. Each entry can also include the request specifier indicating whether the client device 125 associated with the device identifier is to select the content pod 140A-N using the content selection parameter. Each entry can also include one or more content selection parameters from previous requests for content from the client device 125. In some implementations, the request for content from the client device 125 may lack the request specifier. Each time a request for content is received from the client device 125, the request handler 132 can determine whether the client device 125 is to receive a content pod 140A-N using the content selection parameter. The request handler 132 can parse the request to identify the device identifier.

Using the device identifier for the client device 125, the request handler 132 can access the request specifier log maintained at the database 138 to identify the entry corresponding to the client device 125. From the entry for the client device 125, the request handler 132 can identify the request specifier and the one or more previous content selection parameters. If the request specifier indicates that the content selection parameter is to be used in selecting the content pod 140A-N, the request handler 132 can parse the request for content to identify the content selection parameter. The request handler 132 can store the content selection parameter in the entry. On the other hand, if the request specifier indicates that the content selection parameter is not to be used in selecting the content pod 140A-N, selection of the content pod 140A-N may proceed without use of the content selection parameter from the current request.

In some implementations, upon receiving the request for content from the client device 125 via the network 105, the request handler 132 can identify a time of receipt of the request for content. The request handler 132 can also determine a current time in the playing of the streaming content 142. The current time may correspond to one of the streaming content portions 156A-N or one of the content breaks 158A-N. Based on the identified time of receipt of the request for content and the current time in the playing of the streaming content 142, the request handler 132 can determine whether the request for content was generated at the client device 125 during one of the streaming content portions 156A-N or one of the content breaks 158A-N. In some implementations, the request handler 132 can determine an estimated delay time between time of generation of the request for content and the time of receipt based on conditions in the network 105 (e.g., using network ping tests). The request handler 132 can subtract the estimated delay time from the time of receipt to calculate the time of generation of the request for content. In some implementations, the request handler 132 can parse the request for content to identify the time stamp to determine the time of generation of the request. If the request for content is determined to have been generated during one of the streaming content portions 156A-N, the request handler 132 can determine that the content selection parameter is to be used in selecting the content pod 140A-N. The request handler 132 can parse the request for content to identify the content selection parameter. If the request for content is determined to have been generated during one of the streaming content portions 156A-N, selection of the content pod 140A-N may proceed without use of the content selection parameter from the current request.

Based on the request for content received from the client device 125, the content selector 134 can select one of the content pods 140A-N to provide to the client device 125. From the device identifier corresponding to the client device 125, the reference address identifying the streaming content 142, the request specifier, the time stamp of generation, the sequence number, the time remaining in the streaming content portion 156A-N, the time remaining in the content break 158A-N, or the content selection parameter parsed from the request for content, the content selector 134 can select the content pod 140A-N. The content selector 134 can identify a plurality of content pods 140A-N available from the content pod provider 115 for insertion into the content break 158A-N for the client device 125. In some implementations, the content selector 134 can identify the plurality of content pods 140A-N of the same or shorter length as the time remaining in the content break 158A-N. In some implementations, the content selector 134 can identify a plurality of reference address for the corresponding plurality of content pods 140A-N. The content selector 134 can also identify a content provision parameter for each content pod 140A-N from the content pod provider 115. The content provision parameter for a content pod 140A-N can include metadata (e.g., one or more tagged keywords), the reference address for other designated content pods 140A-N, the reference address for a designated streaming content 142, predesignated historical interactions on content, a predesignated location identifier, or a predesignated account profile, among other data. Using the content provision parameter and the request, the content selector 134 can select one of the identified plurality of content pods 140A-N for insertion and playback during the content break 158A-N at the client device 125.

Depending on the request specifier identifier from the request for content or the request specifier log, the content selector 134 can select one of the identified plurality of content pods 140A-N. If the request specifier indicates that the content selection parameter is to be used in the selection of the content pod 140A-N, the content selector 134 can use the content selection parameter from the request for the content to select the content pod 140A-N. The content selector 134 can determine a selection priority score based on a number of matches between the content selection parameter from the current request and the content provision parameter for the content pod 140A-N. For example, a match between the location identifier for the client device 125 from the current request with one of the predesignated location identifiers in the content provision parameter may result in the raise of the selection priority score. The content selector 134 can then rank the content pods 140A-N by the selection priority scores. For insertion and playback in the content break 158A-N at the client device 125, the content selector 134 can select the content pod 140A-N corresponding to the highest selection priority score. In some implementations, the content selector 134 can identify the reference address for the selected content pod 140A-N.

On the other hand, if the request specifier indicates that the content selection parameter is not to be used in the selection of the content pod 140A-N, the content selector 134 can use the content selection parameter from previous requests for content stored on the database 138. The content selector 134 can determine a selection priority score based on a number of matches between the content selection parameters from prior requests for content and the content provision parameter for the content pod 140A-N. For example, a match between the location identifier for the client device 125 from a prior request with one of the predesignated location identifiers in the content provision parameter may result in the raise of the selection priority score. The content selector 134 can then rank the content pods 140A-N by the selection priority scores. For insertion and playback in the content break 158A-N at the client device 125, the content selector 134 can select the content pod 140A-N corresponding to the highest selection priority score. In some implementations, the content selector 134 can identify the reference address for the selected content pod 140A-N.

With the selection of the content pod 140A-N, the response handler 136 can transmit a response to the client device 125. In response to the selection, the response handler 136 can generate the response to the client device 125. The response can include the selected content pod 140A-N. In some implementations, the response can include the reference address for the selected content pod 140A-N. The response can include a request specifier. The response handler 136 can determine the new request specifier for the request based on the request specifier from the previous requests for content. If the request specifier in the previous request for content indicated that the content selection parameter is to be used, the response handler 136 can set the new request specifier to indicate that the content selection parameter is not to be used in selection of the next content pod 140A-N. If the request specifier in the previous request for content indicated that the content selection parameter is not to be used, the response handler 136 can set the new request specifier to indicate that the content selection parameter is to be used in selection of the next content pod 140A-N.

In some implementations, the response handler 136 can identify a time elapsed since the receipt of the previous content selection parameter. The response handler 136 can compare the time elapsed to a predetermined time threshold (e.g., 15 seconds to 30 minutes). If the time elapsed is greater than the predetermined time threshold, the response handler 136 can set the new request specifier to indicate that the content selection parameter is to be used in selection of the next content pod 140A-N. Conversely, if the time elapsed is less than the predetermined time threshold, the response handler 136 can set the new request specifier to indicate that the content selection parameter is not to be used in selection of the next content pod 140A-N. Subsequent to generation of the response, the response handler 136 can transmit the response to the client device 125 via the network 105 for playback of the content pod 140A-N during the content break 158A-N.

In some implementations, the response handler 136 can transmit the response to the client devices 125 in accordance to a pod distribution policy. The pod distribution policy may be maintained at the database 138. The pod distribution policy can specify a plurality of predefined pod distribution times at which the response handler 136 is to transmit the response to specific client devices 125, and may be determined in a manner similar to the request generation policy 164. The predefined pod distribution times may be based on a time at occurrence of the streaming content portions 156A-N and the content breaks 158A-N. The response handler 136 can identify a current time during the streaming content 142. The response handler 136 can compare the current time to the predefined pod distribution times of the pod distribution policy. If the current time matches one of the predefined pod distribution times for a particular client device 125, the response handler 136 can transmit the response to the client device 125. In this manner, the amount of bandwidth consumed due to responses from the data processing system 110 to the client devices 125 in the network 105 may be further reduced.

Upon receipt of the response from the response handler 136, the pod inserter 162 running on the client device 125 can insert the content pod 140A-N into the content break 158A-N. In some implementations, the pod inserter 162 can parse the response to identify the reference address corresponding to the selected content pod 140A-N. With the identified reference address, the pod inserter 162 can retrieve the content pod 140A-N from the content pod provider 115. In response to receiving the response, the pod inserter 162 can store the content pod 140A-N.

When the response is received, the media player 152 may be playing either one of the streaming content portions 156A-N or another content pod 140A-N during one of the content breaks 158A-N. The pod inserter 162 can monitor the media player 152 to identify whether one of the streaming content portions 156A-N or another content pod 140A-N is being played. If one of the streaming content portions 156A-N is identified as being played, the pod inserter 162 can wait until detection of the onset of the content break 158A-N following the currently played streaming content portion 156A-N to insert the content pod 140A-N. Once the onset of the following content break 158A-N is detected, the pod inserter 162 can invoke the media player 152 to playback the content pod 140A-N from the response subsequent to the preceding streaming content portion 156A-N. If another content pod 140A-N is identified as being played in the content break 158A-N, the pod inserter 162 can wait until detection of the termination of the currently playing content pod 140A-N to insert the content pod 140A-N from the response. Once the termination of the currently played content pod 140A-N is detected, the pod inserter 162 can invoke the media player 152 to playback the content pod 140A-N from the response subsequent to the preceding content pod 140A-N.

Figure 2:
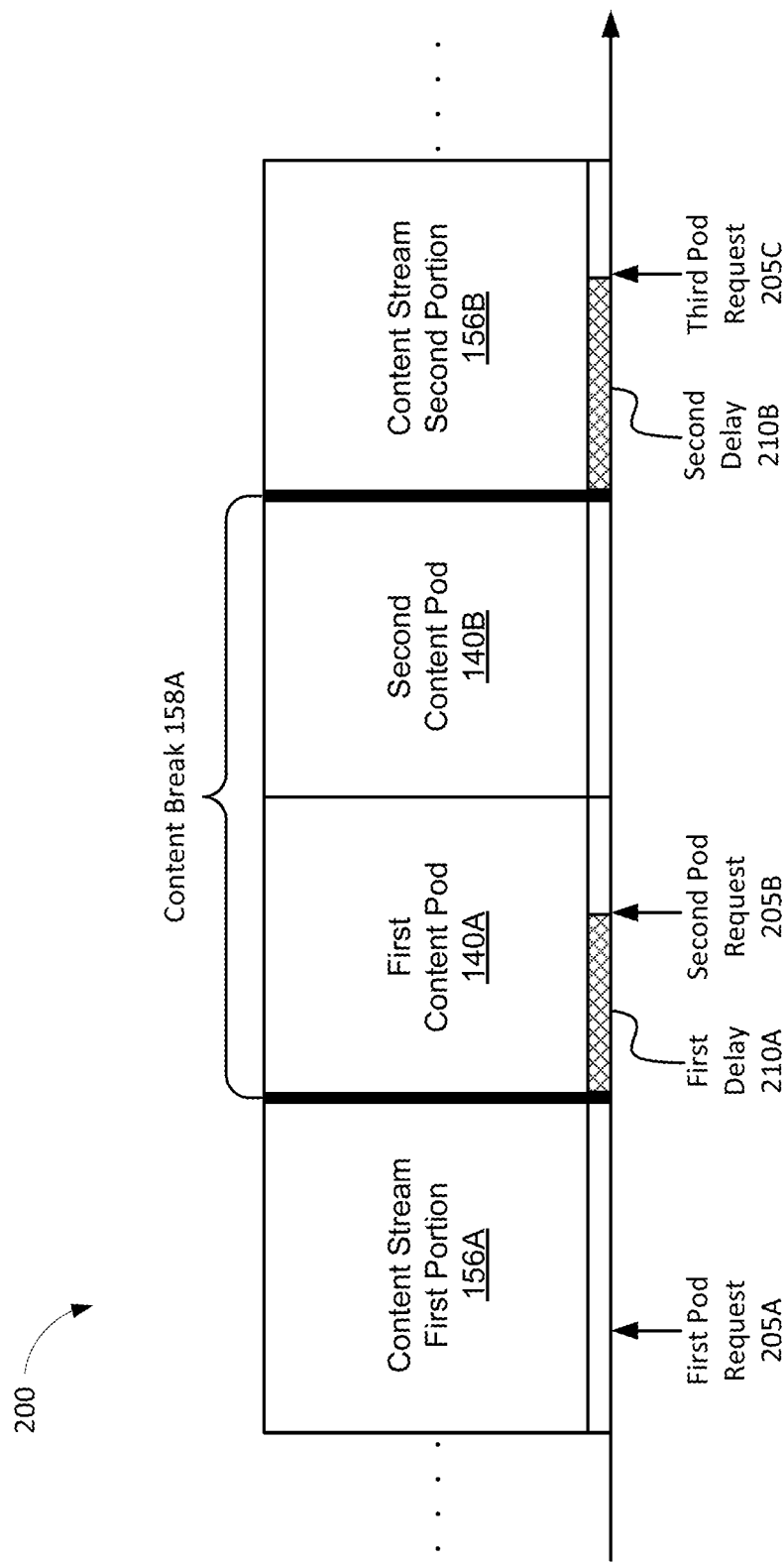
FIG. 2 is a block diagram depicting a stream sequence of distributing network traffic during streaming, according to an illustrative implementation.

Now referring to FIG. 2, depicted is a stream sequence 200 of distributing network traffic during streaming. In the context of FIG. 1, the stream sequence 200 may correspond to the streaming content 142 played by the media player 152 at the client device 125 represented in a temporal series. The stream sequence 200 can include a first streaming content portion 156A, followed by a content break 158A, and then a second streaming content portion 156B. In accordance with the predefined request generation times of the request generation policy 164, the request generator 160 running on the client device 125 can generate and transmit requests for content.

Sometime during the first portion, the request generator 160 can generate and transmit a first request for content 205A to the data processing system 110. Subsequently, the pod inserter 162 can receive a response with a first content pod 140A, and can insert the first content pod 140A into the content break 158A for playback subsequent to the end of the first streaming content portion 156A. After playing the first streaming content portion 156A of streaming content 142, the media player 152 can then initiate playback of the first content pod 140A.

While the first content pod 140A is being played back by the media player 152, the request generator 160 can identify whether a current time in the streaming content 142 matches one of the predefined request generation times specified by the request generation policy 164. The request generation policy 164 may specify a first delay 210A after the end of the first streaming content portion 156A to generate and transmit another request. At the first delay 210A, the request generator 160 can generate and transmit a second request for content 205B to the data processing system 110. Again, the pod inserter 162 can receive a response with a second content pod 140B, and can insert the second content pod 140B into the content break 158A for playback subsequent to the end of the first content pod 140A.

Following the end of the content break 158A and during the second streaming content portion 156B, the request generator 160 can continue to identify whether a current time in the streaming content 142 matches one of the predefined request generation times specified by the request generation policy 164. The request generation policy 164 may specify a second delay 210B after the end of the content break 158A to generate and transmit another request. At the second delay 210B, the request generator 160 can generate and transmit a third request for content 205C to the data processing system 110. Again, the pod inserter 162 can receive a response with a third content pod 140C, and can insert the second content pod 140 into the next content break 158B for playback subsequent to the end of the second streaming content portion 156B. This process may be repeated over consecutive streaming content portions 156C-N and content breaks 158B-N.

Figure 3A:
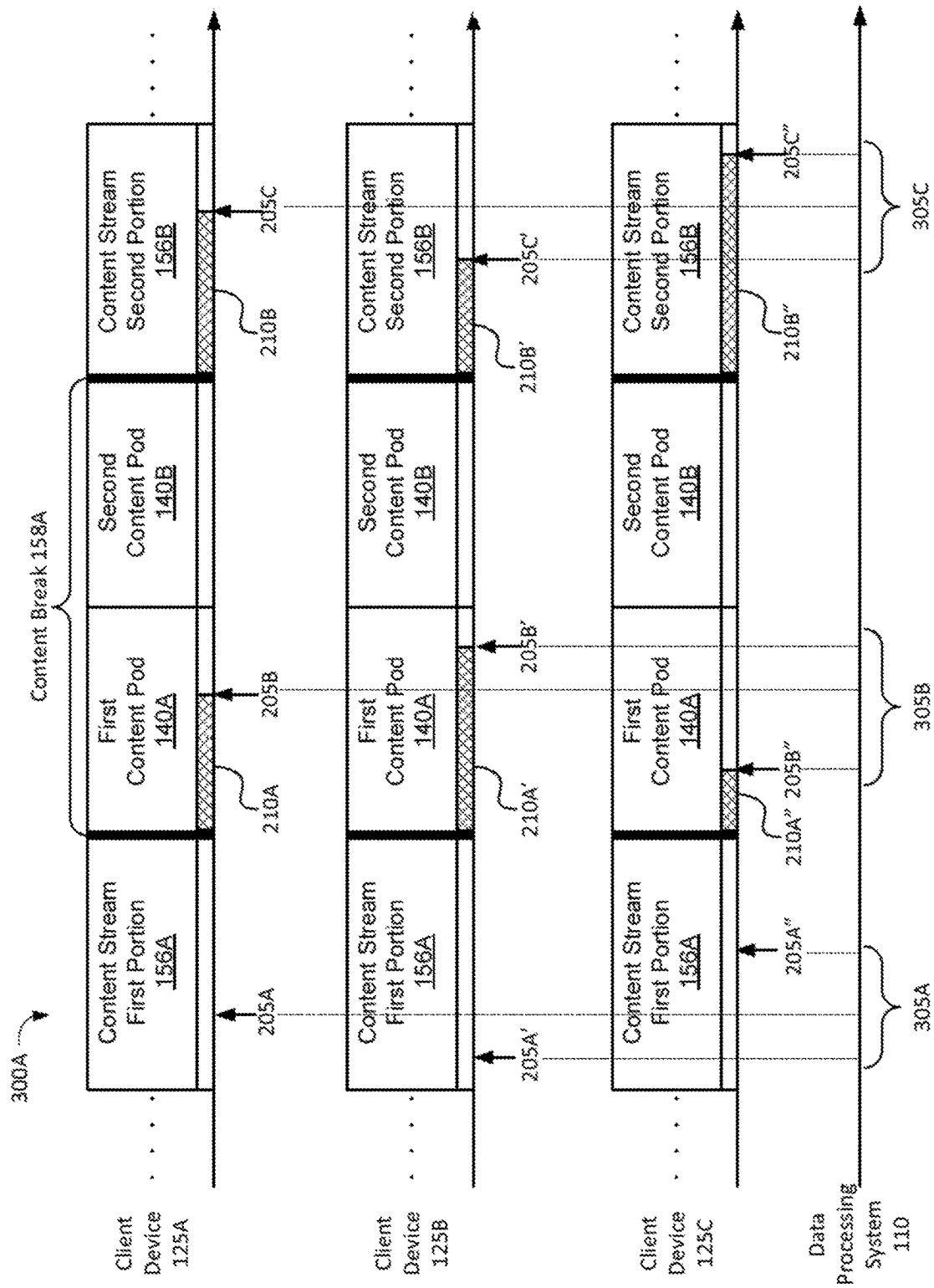
FIGS. 3A-3C are block diagrams each depicting a stream sequence of distributing network traffic during streaming across a multitude of client devices, according to an illustrative implementation.

Now referring to FIG. 3A, depicted are stream sequences 300A of distributing network traffic during streaming across a multitude of client devices. In the context of FIG. 1, the stream sequences 300A may correspond to the streaming content 142 played by the media player 152 at various client device 125A-C represented in a temporal series. The predefined request generation times of request generation policy 164 may be determined by the policy generator 130 such that requests are generated at different times by each client device 125A-N and are thus received at different times at the data processing system 110. The request generation policy 164 can specify that the first client device 125A is to generate a first request 205A after some predefined request generation time delay, a second request 205B after a first delay 210A following the end of the first streaming content portion 156A, and a second request 205C after a second delay 210B following the end of the content break 158A. The request generation policy 164 can specify that the second client device 125B is to generate a first request 205A' after some predefined request generation time delay, a second request 205B' after a first delay 210A' following the end of the first streaming content portion 156A, and a second request 205C' after a second delay 210B' following the end of the content break 158A. The request generation policy 164 can specify that the third client device 125C is to generate a first request 205A" after some predefined request generation time delay, a second request 205B" after a first delay 210A" following the end of the first streaming content portion 156A, and a second request 205C" after a second delay 210B" following the end of the content break 158A. In this manner, the data processing system 110 can receive the first batch of requests 205A, 205A', and 205A" dispersed over a first time window 305A. The data processing system 110 can receive the second batch of requests 205B, 205B', and 205B" dispersed over a second time window 305B. The data processing system 110 can receive the third batch of requests 205C, 205C', and 205C" dispersed over a third time window 305C. As the requests for each content pod 140A-C are received dispersed over time windows 305A-C, the consumption of computing resources at the data processing system 110 at a single point in time may be decreased, relative to had all the requests for each content pod 140A-N been received at a single time.

Figure 3B:
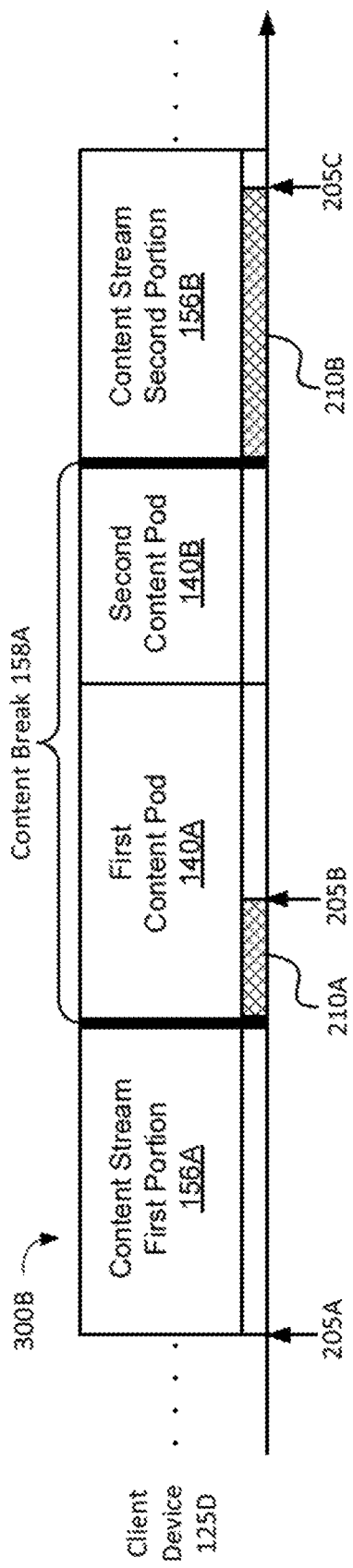

Now referring to FIG. 3B, illustrated is a stream sequence 300B of distributing network traffic during streaming across a multitude of client devices. In the context of FIG. 1, the stream sequence 300B may be what is streamed and played by the media player 152 at the client device 125D represented in a temporal series. In stream sequence 300B, the length of the first content pod 140A may differ the length of the second content pod 140B, although the length of the content break 158A may be the same as the previous examples as depicted in FIG. 3A. The predefined request generation times of the request generation policy 164 may be applicable to situations where the content pods 140A and 140B provided to the client device 125D may differ in length.

Figure 3C:
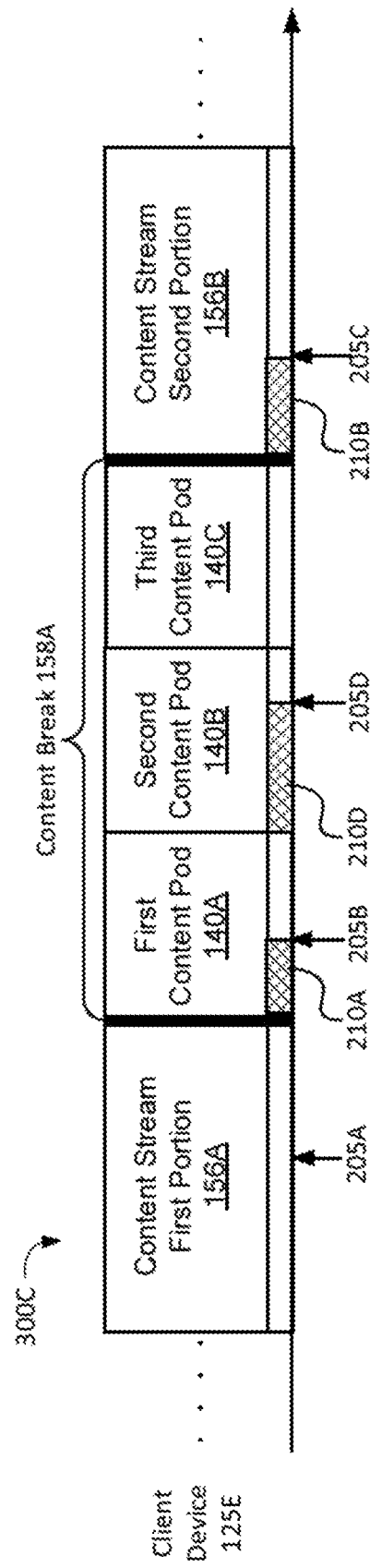

Now referring to FIG. 3C, shown is a stream sequence 300C of distributing network traffic during streaming across a multitude of client devices. In the context of FIG. 1, the stream sequence 300C may be what is streamed and played by the media player 152 at the client device 125E represented in a temporal series. In stream sequence 300C, the number of content pods 140A-C in the content break 158A, although the length of the content break 158A may be the same as the previous examples. The predefined request generation times of the request generation policy 164 may be applicable to situations where the number of content pods 140A-C in the content break 158A to one client device 125E may differ from the other client devices 125A-D as depicted in FIGS. 3A and 3B. As there may be one additional content pod 140C, the request generator 160 can generate and transmit another request 205D for content after another predefined request generation time delay 210D.

Figure 4A:
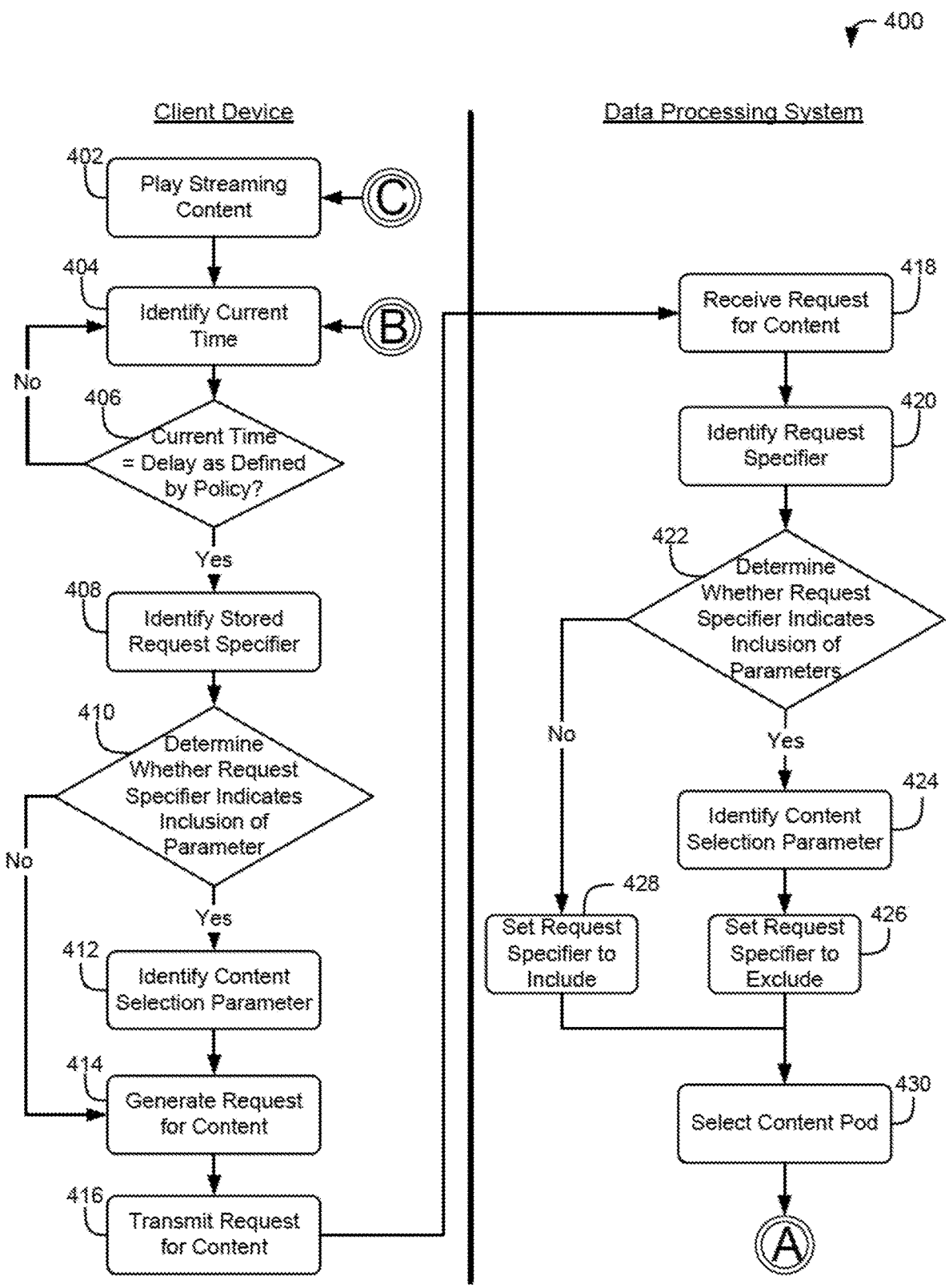
FIGS. 4A and 4B are flow diagrams depicting a method of distributing network traffic during streaming, according to an illustrative implementation.
Figure 4B:
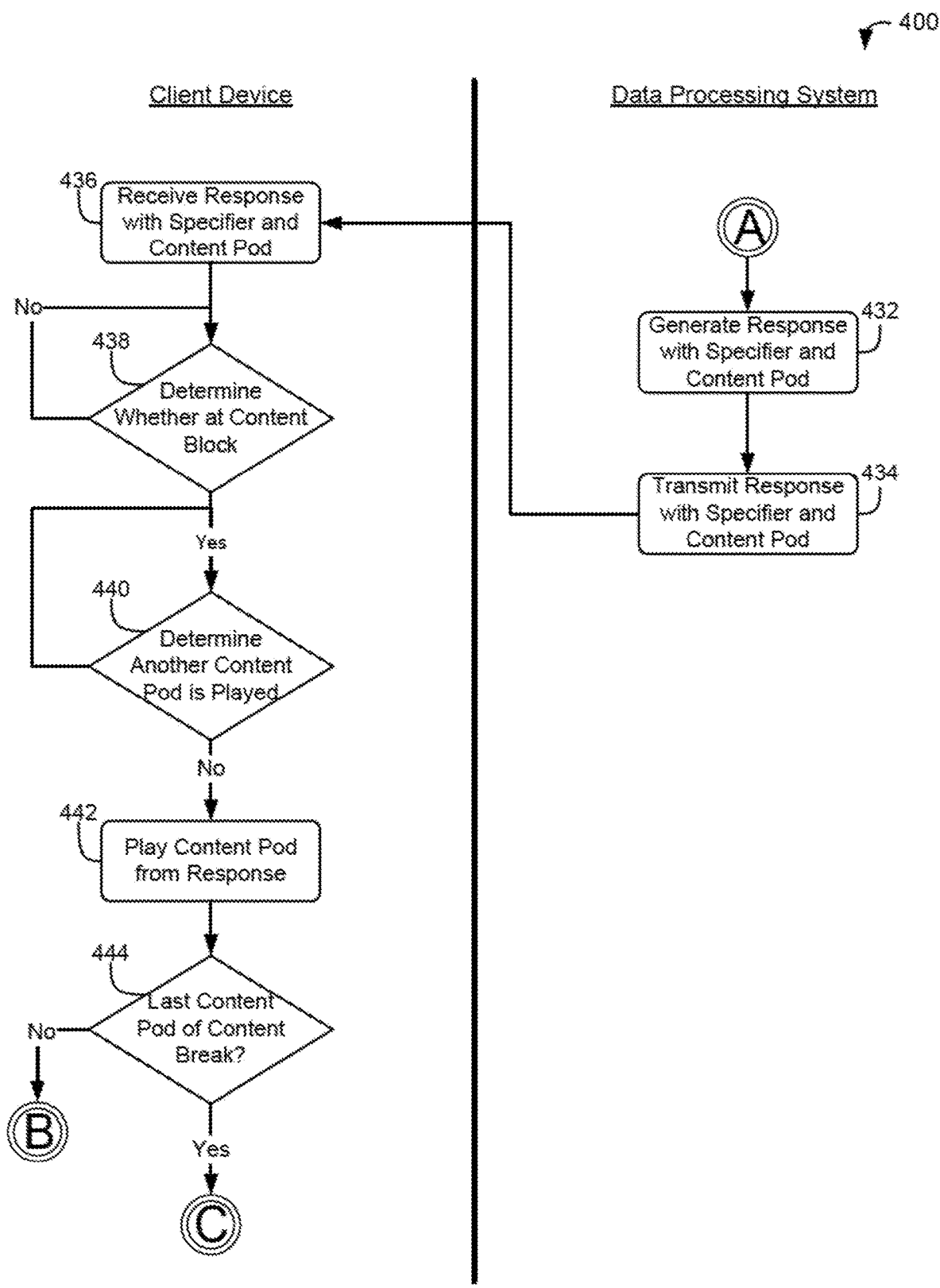

Now referring to FIGS. 4A and 4B, depicted is a flow diagram a method 400 of distributing network traffic during streaming. The functionality described herein with respect to method 400 can be performed or otherwise executed by the system 100 as shown on FIG. 1 (e.g., the data processing system 110, the content pod provider 115, the streaming content provider 120, and the client device 125) or a computing device as shown in FIG. 5 or any combination thereof.

In further detail, at step 402, a client device can play streaming content. At step 404, the client device can identify a current time within the streaming content. At step 406, the client device can determine whether the current time matches a delay as defined by a request generation policy. If the current time does not match, the client device can repeat the functionality of step 404. If the current time matches, at step 408, the client device can identify a stored request specifier. At step 410, the client device can determine whether the request specifier indicates inclusion of a content selection parameter. If the request specifier indicates inclusion, at step 412, the client device can identify a content selection parameter. In either event, at step 414, the client device can generate a request for content. The request for content can include the content selection parameter identified in step 412. At step 416, the client device can transmit a request for content to a data processing system.

At step 418, the data processing system can receive the request for content. At step 420, the data processing system can identify the request specifier in the request for content. At step 422, the data processing system can determine whether the request specifier indicates inclusion of the content selection parameter. If the request specifier indicates the inclusion of the content selection parameter, at step 424, the data processing system can identify the content selection parameter from the request for content. At step 426, the data processing system can set a subsequent request specifier to exclude the content selection parameter. If the request specifier does not indicate the inclusion of the content selection parameter, at step 428, the data processing system can set a subsequent request to include the content selection parameter. At step 430, the data processing system can select a content pod. At step 432, the data processing system can generate a response with the request specifier and the selected content pod. At step 434, the data processing system can transmit the response with the request specifier and the selected content pod to the client device.

At step 436, the client device can receive the response with the request specifier and the selected content pod from the data processing system. At step 438, the client device can determine whether a content block is currently being played. If a content block is not currently being played, the client device can repeat the functionality of step 438. If a content block is currently being played, at step 440, the client device can determine whether another content pod is currently being played. If another content pod is being played, the client device can repeat the functionality of step 440. If another content pod is not being played, at step 442, the client device can play the content pod from the response. At step 444, the client device can determine whether content pod is the last in the content break. If the currently played content pod is the last content pod in the content break, the client device can repeat the functionality of step 402 and repeat the method 400 from thereon. If the currently played content pod is not the last content pod in the content break, the client device can repeat the functionality of step 404 and repeat the method 400 from thereon.

Figure 5:
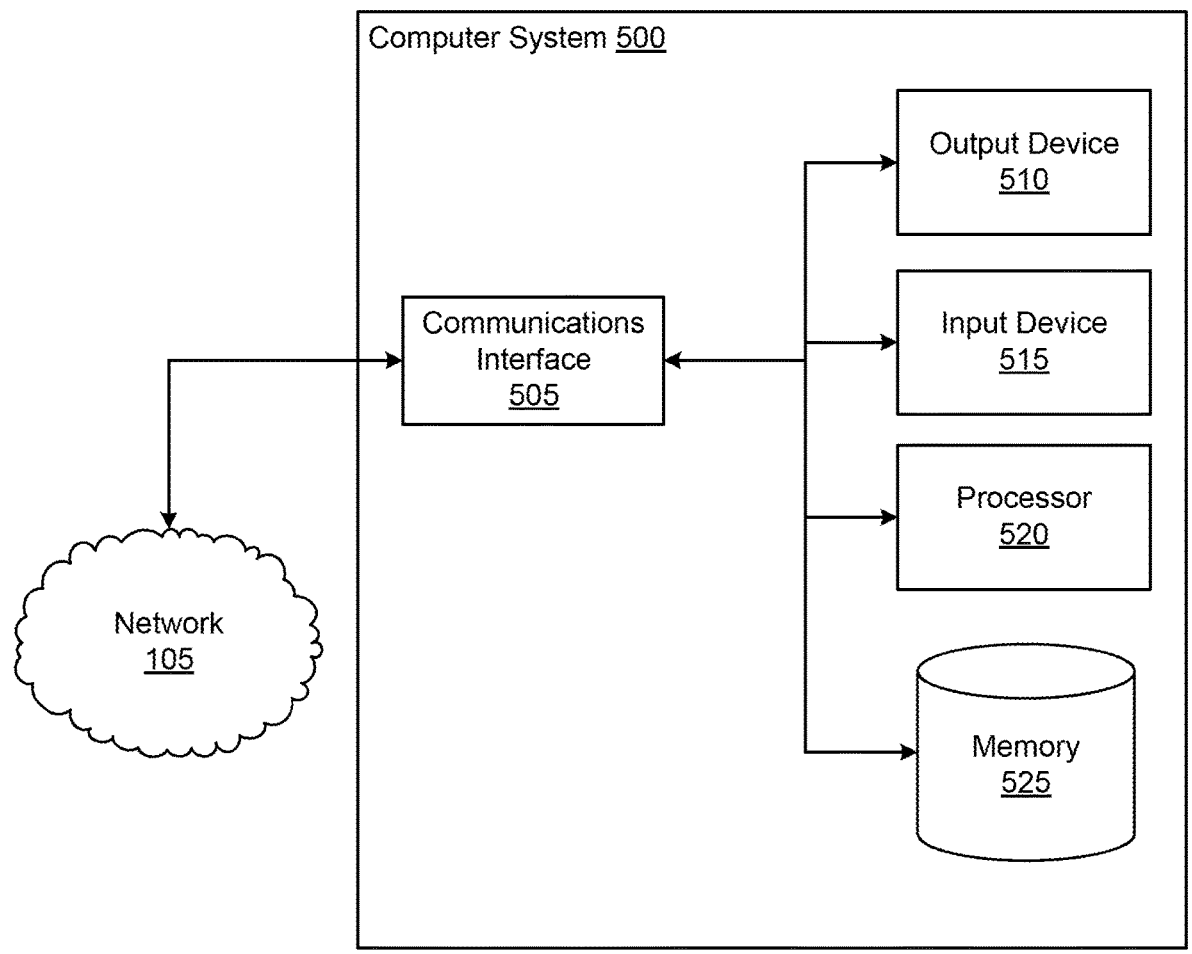
FIG. 5 is a block diagram illustrating a general architecture for a computer system that may be employed to implement elements of the systems and methods described and illustrated herein, according to an illustrative implementation.

FIG. 5 shows the general architecture of an illustrative computer system 500 that may be employed to implement any of the computer systems discussed herein (including the data processing system 110 and its components, the content pod provider 115 and its components, the streaming content provider 120 and its components, the live stream source 144 and the client device 125 and its components) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the data processing system 110. The processors 520 can be included in the content pod providers 115. The processors 520 can be included in the streaming content providers 120. The processors 520 can be included in the client device 125 or the other components of the client device 125.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 525 to store information related to the availability of one or more content pods, among others. The memory 525 can include the database 138. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or made to control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1 or FIG. 5, one or more communications interfaces facilitate information flow between the components of the system 500. In some implementations, the communications interface(s) may be configured (e.g., via various hardware components or software components) to provide a website as an access portal to at least some aspects of the computer system 500. Examples of communications interfaces 505 include user interfaces (e.g., webpages), through which the user can communicate with the data processing system 110.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable a receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, or other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In some implementations, the features may be implemented on a laptop computer or other personal computer, a smartphone, other mobile phone, handheld computer, a tablet PC, or other computing device. In some implementations, the features disclosed herein may be implemented on a wearable device or component (e.g., smart watch) which may include a processing module configured to integrate internet connectivity (e.g., with another computing device or the network 105).

The operations described in this specification can be implemented as operations performed by a data processing apparatus on data stored on one or more computer-readable storage devices or on data received from other sources.

The terms "data processing apparatus", "data processing system", "user device" or "computing device" encompasses all kinds of apparatuses, devices, and machines for processing data, including by way of example a programmable processor, a computer, a system on a chip or multiple chips, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The script provider 128, the policy generator 130, the request handler 132, the content selector 134, and the response handler 136 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from read-only memory or random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can include any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 500 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. The script provider 128, the policy generator 130, the request handler 132, the content selector 134, and the response handler 136 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to distributing network traffic during streaming and deploying countermeasures thereto, the systems and methods described herein can include applied to other environments. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A method of distributing network traffic during streaming, comprising:

identifying, by a data processing system having one or more processors, for a first client device, a first content pod to insert in a content break separating a first portion and a second portion of the streaming content to be played on the first client device;

identifying, by the data processing system, for a second client device, a first content pod and a second content pod to insert in the content break separating the first portion and the second portion of the streaming content to be played on the second client device, the content break to be played on the first client device at a same time as the content break on the second client device, a number of content pods to be inserted for the first client device different from a second number of content pods to be inserted for the second client device;

determining, by the data processing system, for the first client device, a time at which to generate a request for content during playing of the streaming content on the first client device based on an expected time duration of the first content pod to be inserted in the content break;

providing, by the data processing system to the first client device, a first script configured to manage playing of the streaming content and the first content pod on the first client device, the first script identifying the time at which the first client device is to generate the request for content;

determining, by the data processing system, for the second client device, a time which to generate a request for content during the playing of the streaming content on the second client device based on an expected time duration of the first content pod for the second client device, the expected time duration for the first client device different from the expected time duration for the second client device, the time at which the first client device is to generate the request for content different from the time at which the second client device is to generate the request for content;

providing, by the data processing system to the second client device, a second script configured to manage playing of the streaming content, the first content pod, and the second content pod on the second client device, the second script identifying the time at which the second client device is to generate the request for content;

receiving, by the data processing system, from the first client device at the time in accordance with the first script, the request for content to insert as the first content pod in the content break for playback on the first client device;

receiving, by the data processing system, from the second client device at the time in accordance with the second script, the request for content to insert as the first content pod in the content break for playback on the second client device;

selecting, by the data processing system responsive to receipt of the request at the time, the first content pod to insert in the content break for playback on the first client device based on the request;

providing, by the data processing system, the first content pod to the first client device for playback in the content break responsive to selection of the first content pod;

selecting, by the data processing system responsive to receipt of the request at the time, the first content pod to insert in the content break for playback on the second client device; and providing, by the data processing system, the first content pod to the second client device for playback in the content break responsive to selection of the first content pod.

2. The method of claim 1, wherein providing the first content pod to the first client device further comprises providing the first content pod to the first client device in accordance with a pod distribution policy.

3. The method of claim 1, wherein providing the first content pod to the first client device further comprises providing the first content pod to the first client device, the first content pod including a request specifier specifying that the first client device is to send a subsequent request with a content selection parameter.

4. The method of claim 1, wherein receiving the request from the first client device further comprises receiving the request from the first client device, the first request including a first content selection parameter generated at the first time responsive to a request specifier included with the first content pod, the request specifier specifying that the first client device is to send the request with the first content selection parameter.

5. The method of claim 1, wherein selecting the first content pod for the first client device further comprises selecting the first content pod based on previous requests for content to insert into previous content breaks and on the streaming content, each of the previous requests received from the first client device prior to the request for content and including a content selection parameter.

6. The method of claim 1, wherein selecting the first content pod for the first client device further comprises selecting the first content pod based on a content selection parameter included in the request, the content selection parameter including at least one of: a reference address identifying an information resource on which the streaming content is displayed, historical interaction data on content by the first client device, or a pod reference identifying a previous content pod provided to the first client device.

7. The method of claim 1, further comprising:
determining, by the data processing system, that the request received from the first client device is generated during playback of a previous content pod via the request generation policy based a time of the receipt of the first request; and
wherein selecting the first content pod for the first client device further comprises selecting the first content pod, responsive to determining that the request received from the first client device is generated during playback of the previous content pod.

8. The method of claim 1, further comprising:
maintaining, by the data processing system, a request specifier log including a plurality of entries, each entry of the request specifier log indicating whether the first client device is to select a corresponding content pod using a respective content selection parameter;
determining, by the data processing system, that the first client device is to receive the first content pod using a first content selection parameter included in the request based on a first entry of the request specifier log corresponding to the first client device; and
wherein selecting the first content pod further comprises selecting the first content pod based on the first content selection parameter of the request, responsive to determining that the first client device is to receive the first content pod using the first content selection parameter based on the first entry.

9. The method of claim 1, wherein receiving the request for the first client device further comprises receiving the request for content generated via a central request distribution policy, the central request distribution policy specifying a respective time for generating a respective request for each client device of the plurality of client devices.

10. A system for distributing network traffic during streaming, comprising:
a data processing system having one or more processors coupled with memory, configured to:
identify, for a first client device, a first content pod to insert in a content break separating a first portion and a second portion of the streaming content to be played on the first client device;
identify, for a second client device, a first content pod and a second content pod to insert in the content break separating the first portion and the second portion of the streaming content to be played on the second client device, the content break to be played on the first client device at a same time as the content break on the second client device, a number of content pods to be inserted for the first client device different from a number of content pods to be inserted for the second client device;

determine, for the first client device, a time at which to generate a request for content during playing of the streaming content on the first client device based on an expected time duration of the first content pod to be inserted in the content break;

provide, to the first client device, a first script configured to manage playing of the streaming content and the first content pod on the first client device, the first script identifying the time at which the first client device is to generate the request for content;

determine, for the second client device, a time which to generate a request for content during the playing of the streaming content on the second client device based on an expected time duration of the first content pod for the second client device, the expected time duration for the first client device different from the expected time duration for the second client device, the time at which the first client device is to generate the request for content different from the time at which the second client device is to generate the request for content;

provide, to the second client device, a second script configured to manage playing of the streaming content, the first content pod, and the second content pod on the second client device, the second script identifying the time at which the second client device is to generate the request for content;

receive, from the first client device at the time in accordance with the first script, the request for content to insert as the first content pod in the content break for playback on the first client device;

receive, from the second client device at the time in accordance with the second script, the request for content to insert as the first content pod in the content break for playback on the second client device;

select, responsive to receipt of the request at the time, the first content pod to insert in the content break for playback on the first client device based on the request;

provide the first content pod to the first client device for playback in the content break responsive to selection of the first content pod;

select, responsive to receipt of the request at the time, the first content pod to insert in the content break for playback on the second client device; and provide the first content pod to the second client device for playback in the content break responsive to selection of the first content pod.

11. The system of claim 10, wherein the data processing system is further configured to provide the first content pod to the first client device in accordance with a pod distribution policy.

12. The system of claim 10, wherein the data processing system is further configured to provide the first content pod to first client device of the plurality of client devices, the first content pod including a first request specifier specifying that the first client device is to send a subsequent request with a content selection parameter.

13. The system of claim 10, wherein the data processing system is further configured to receive the request from the first client device, the request including a first content selection parameter generated at the first time responsive to a first request specifier included with the first content pod, the first request specifier specifying that the first client device is to send the request with the first content selection parameter.

14. The system of claim 10, wherein the data processing system is further configured to select the first content pod for the first client device based on previous requests for content to insert into previous content breaks and on the streaming content, each of the previous requests received from the first client device prior to the request for content and including a content selection parameter.

15. The system of claim 10, wherein the data processing system is further configured to select the first content pod for the first client device based on a content selection parameter included in the request, the content selection parameter including at least one of a reference address identifying an information resource on which the streaming content is displayed, historical interaction data on content by the first client device, or a pod reference identifying a previous content pod provided to the first client device.

16. The system of claim 10, wherein the data processing system is further configured to:

determine that the request received from the first client device is generated during playback of a previous content pod via the first request generation policy based a time of the receipt of the request; and select the first content pod, responsive to determining that the request received from the first client device is generated during playback of the previous content pod.

17. The system of claim 10, wherein the data processing system is further configured to:

maintain a request specifier log including a plurality of entries, each entry of the request specifier log indicating whether the first client device is to select a corresponding content pod using a respective content selection parameter;

determine that the first client device is to receive the first content pod using a first content selection parameter included in the request based on a first entry of the request specifier log corresponding to the first client device; and select the first content pod based on the first content selection parameter of the request, responsive to determining that the first client device is to receive the first content pod using the first content selection parameter based on the first entry.

18. The system of claim 10, wherein the data processing system is further configured to:

receive the request for content generated a central request distribution policy, the central request distribution policy specifying a respective time for generating a respective request for each client device of the plurality of client devices.

19. The method of claim 1, wherein identifying the first content pod for the first client device further comprises identifying the content pod based on a schedule for content pods to be inserted into the content break for the first client device.

20. The system of claim 10, wherein the data processing system is further configured to identify the content pod for the first client device based on a schedule for content pods to be inserted into the content break for the first client device.

21. The method of claim 1, further comprising:

determining, by the data processing system, for the second client device, a second time which to generate a second request for content during the playing of the streaming content on the second client device subsequent to the time at which to generate the request based on the expected duration for the first content pod and an expected duration for the second content pod, the second time during the playback of the first content pod; and selecting, by the data processing system responsive to receipt of the second request at the second time during the playback of the first content pod, the second content pod to provide to the second client device to insert in the content break for playback.

22. The system of claim 10, wherein the data processing system is further configured to:

determine, for the second client device, a second time which to generate a second request for content during the playing of the streaming content on the second client device subsequent to the time at which to generate the request based on the expected duration for the first content pod and an expected duration for the second content pod, the second time during the playback of the first content pod; and select, responsive to receipt of the second request at the second time during the playback of the first content pod, the second content pod to provide to the second client device to insert in the content break for playback.

* * * * *